April 16, 1957  O. A. KEYES  2,788,726
TERRACER
Filed Sept. 21, 1953

INVENTOR.
Orval A. Keyes

United States Patent Office 2,788,726
Patented Apr. 16, 1957

2,788,726
TERRACER

Orval A. Keyes, Springfield, Nebr.

Application September 21, 1953, Serial No. 381,229

7 Claims. (Cl. 97—37)

This invention relates to terracing and more particularly it is an object of this invention to provide a machine for building terraces more efficiently than heretofore.

This application is a continuation in part of patent application Serial Number 357,106, filed May 25, 1953 entitled Terracer, the applicant being Orval A. Keyes.

The terracer of this invention is similar to the earlier application with the exception that the disc in this application presents its bottom edge to the earth at the exact same angle regardless of the depth of cutting. This is approximately, but not exactly, also true of the terracer of the earlier application.

The importance of conformity in the position of the lower edge of the blade, as it digs, comes from the fact that a given desired angle of adjustment is best and the operator will desire the same position with respect to oncoming earth regardless of minor changes in the depth of cut.

In particular the above objective is obtained by mounting it upon three bars, one of which is vertically spaced apart from and disposed in parallelism with respect to the others.

I have found that the use of a rotating disc mounted on a tractor at an angle to the line of draft and driven from the power take-off of a tractor will dig a channel in plowed ground and will by its rotation throw the dirt upward and out to the side of the tractor to build the terrace.

My invention's chief characteristic is its simplicity, leading to economy of construction and manufacture, the dirt being thrown by a simple disc and outwardly a sufficient distance for building a broad base terrace.

I am aware that discs are used on plows, elevating graders, and in other uses but to my knowledge no one has ever before conceived of the idea of driving a disc with power for throwing dirt to the side to build terraces.

Another object of the invention is to provide a terracing device as described which will mount on tractors having a three-point hook-up whereby the implement of this invention need not have its own wheels.

Yet another object is to provide a terracing implement as described which can be mounted on its own wheels and pulled by any type of a tractor or by a jeep or any other vehicle or prime mover.

Still another object is to provide a terracer as described the disc of which can be directly driven from the power take-off of a tractor by direct connection with two universal joints. The combination of universal joints with the power driven disc is a new combination of my invention.

Yet another object is to provide a terracing machine as described having a gear box in the combination for controlling the direction of the rotation of the disc to throw dirt to one side or the other.

Another object is to provide an adjustment frame for making possible the easy changing of the angle of the disc with respect to the line of draft for changing the direction of the throwing of dirt from one side of the terracer to the other.

A further object of the invention lies in the fact that the disc can be moved upwardly and downwardly without disturbance or change of the angle between its axis and the horizontal. This angle is adjustable and predetermined.

Yet a further object is to provide a deflector, or what I call a peeler, to direct the dirt to the side and more particularly I provide means for adjusting the peeler to adjust the distance the dirt is thrown.

Yet another object is to provide a plow blade or a half duck-foot mounted on the terracer forwardly of the disc for loosening the ground preparatory to being thrown by the disc.

Another object of the invention is to provide a deflector or peller which is so shaped as to be well adapted to peel dirt from the concave side of the disc and deflect it to the desired side, when the disc is adjusted for casting dirt to one side of the implement and also when the disc is adjusted for casting dirt to the other side of the implement, without the necessity of adjusting the deflector to a new position, when the disc is changed to a different side of the implement.

A further object resides in the provision of fish plates extending downwardly across and being attached to the opposite side edges of an upper plate, whereby the upper end of the fish plates can be attached to an upper bar and the lower ends of the fish plates can be attached each to a different one of two lower bars, the upper ends of the fish plates being preferably bent inwardly toward each other for this purpose.

A further object resides in the mounting of a rod supporting the deflector upon a bracket attached to the horizontal portion of a disc supporting arm.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 1:
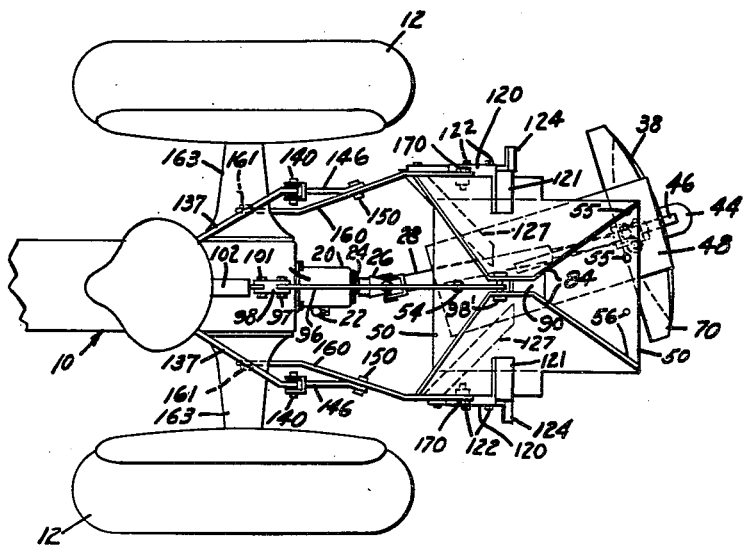
Figure 1 is a top plan view of the tractor shown in Figure 1 with the terracer attached thereto.

The terracer of this invention is adapted to be attached to a conventional tractor generally indicated at 10, having rear wheels 12 on the surface of the ground 14. The tractor 10 has a power take-off shaft in a housing 16 at the rearward end thereof. The power take-off shaft cannot be seen in Figures 1 and 2 but extends into a gearbox 20 having a control lever 22, the gearbox 20 being for reversing rotation, if desired, in accordance with this invention.

At the rearward end of the gearbox 20 is a shaft 24 attached to a universal joint 26.

Attached to the rearward side of the universal joint 26 is a forward portion 28 of a telescoping shaft assembly, the rearward portion 30 of which is secured by means of a universal joint 40 to a shaft 36 extending forwardly from a disc 38.

The shaft 36 is attached to the disc 38 by suitable mounting member 41 fixed to a disc 38 by means of rivets 42.

The rearward end of the shaft 36 extends through the disc 38 and is rotatably mounted in a suitable bearing housing 44 which is carried at the lower end of an arm 46 which has a vertical portion extending upwardly therefrom and has a portion extending horizontally forwardly from said vertical portion.

The horizontal portion of the arm 46 is attached to the lower side of a horizontal plate 48 at its longitudinal centerline, the plate 48 being defined as a lower plate and being disposed beneath an upper horizontal plate 50, the two plates being pivotally attached together by means of a pivot bolt 54 at the forward end of the plates 48 and 50 and at their transverse centers.

The plates 48 and 50 are secured in any one of several desired relative positions of rotation about the bolt 54 by suitable means such as bolts 55 disposed in suitable openings at the right hand side of the plate 50 and through suitable openings in the lower plate 48, for holding the disc in the position shown in Figure 1.

It will be understood that at other times it will be desired to move the disc from the right hand side, as shown in Figure 1, to the left hand side of the line of draft or longitudinal center line of the tractor. This is because it is sometimes desired to throw the dirt to the right hand side of the tractor whereas the position shown in Figure 1 is for throwing dirt to the left hand side.

When changing the disc from the right hand side to the left hand side, as shown, the bolts 55 are removed from their positions shown in Figure 1 and are placed in other bolt holes 56 on the left hand side of the line of draft or the longitudinal center line of the tractor.

As thus described it will be seen that the plate 48 is quickly and easily movable in position so that its rearward end can be on the right hand or left hand side of the line of draft, with its forward end pivoted at 54 at all times.

The plate 48 is preferably of oblong rectangular shape in top plan and extends rearwardly and to the right side of the tractor at its rearward end, while the upper plate 50 is preferably disposed transversely with respect to the tractor and is approximately square.

On one side of the horizontal portion of the arm 46 a bracket 60 is provided. The bracket 60 is preferably of a concave shape on its outer side and is suitably attached to the arm 46 on its inward side.

The concave outer side of the bracket 60 is for receiving an arm 62 which is held in the bracket 60 by a U-bolt 64. The arm 62 extends vertically downward to and is secured to the upper surface of a deflector or peeler member 70 which latter has a convexly curved rearward edge 72. The edge 72 is curved complementally to the forward concave side of the disc 38.

The peeler or deflector member 70 is adapted to peel or deflect dirt from the forward concave side of the disc 38 to cause it to be deflected outwardly and to the opposite side of the implement from that side of the center line on which the disc 38 is disposed.

In addition to being convexly curved on its rearward edge the deflector 70 is also downturned at its rearward edge with respect to its forward edge for the purpose of shaving or peeling dirt from the concave forward side of the disc 38.

At the side edges of the plate 50 fish plates 84 are disposed. The plates 84 overlap the side edges of the plate 50 at the top and bottom and extend at an angle upwardly and inwardly from the side edges of the plates 84.

The plates 84 are suitably attached to the side edges of the upper plate 50 at their point of contact. The plates 84 extend inclinedly across the sides of the plate 50, the upper ends of the plates 84 being spaced apart a short distance. The uppermost ends of the plates 84 are upturned into a vertical position as best seen at 85.

Each fish plates 84 extend at the same incline for a short distance on beyond the bottom of the upper plate 50, although a rearward portion thereof is cut out so that there are no parts of the fish plates 84 disposed below the plate 50 in the area of the rearward half of each fish plate 84. Each fish plate 84 has a lowermost section 86. The sections 86 are each disposed in a vertical plate for a purpose later described.

Figure 2:
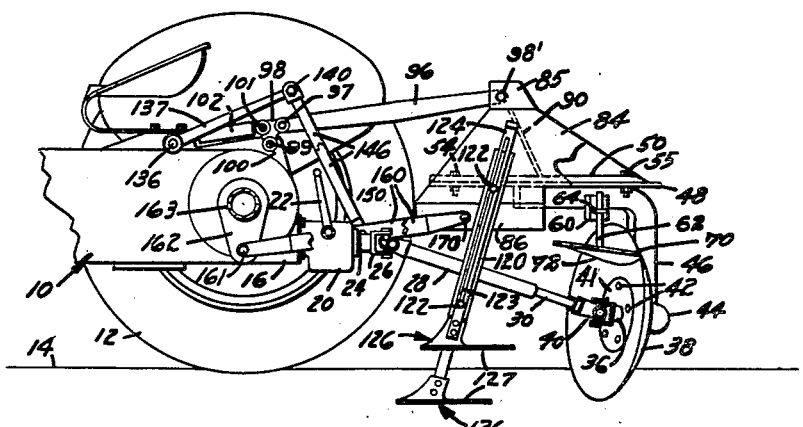
Figure 2 is a side elevation of the terracer of this invention shown as attached to a tractor with one wheel of the tractor and a portion of the axle removed for clarity of illustration, and with one-half-duckfoot down in the ground.

A triangularly shaped bracing member 90 is provided, as partially seen in full lines in Figure 1, and seen in dotted lines in Figure 2. The brace member 90 is disposed in a substantially upright position between the plates 84. The bracing member 90 has its lower edge secured to the upper surface of the upper horizontally disposed plate 50 and its side edges secured to the inner inwardly inclined surfaces of the plates 84.

An arm 96 is disposed at the rearward end of the tractor and is pivoted at its forward end on a bolt 97 to a triangular plate 98.

The triangular plate 98 has a lower corner pivotally attached by means of a bolt 99 to an ear 100 which is vertically disposed and is attached on the upper side of the rearward end of the tractor 10. The forward upper corner of a triangular plate 98 is attached by means of a bolt 101 to a shock absorber 102 which in turn is attached to the tractor by means not shown.

The forward end of the shock absorber 102 extends into a housing of the tractor and it is not believed to require further description here as this mechanism is well known in the art.

The lower end portion 86 of each plate 84 is vertically disposed partially for the purpose of attaching to each vertical section 86 an elongated mounting member 120 which is suitably secured. The mounting member 120 is disposed in an upright position although it inclines forwardly at its lower end somewhat with respect to its upper end. The mounting member 120 is suitably secured to the vertical portion 86.

The upper end of each mounting member 120 is bent inwardly as best seen at 121 and extends to and is suitably secured to the adjacent fish plate 84 for strength of construction.

Each mounting member 120 is provided with bolts 122 extending through suitable apertures therein.

The purpose of the bolts 122 is for reception in a slot 123 in an elongated duck-foot holding member 124. The slotted duck-foot member 124 extends in parallelism with the duck-foot mounting member 120 and its slot 123 is disposed in parallelism with the mounting member 120.

As it is described it will be seen that the loosening and tightening of the bolts 122 will permit the adjustment of the duck-foot carrying members 124 upwardly and downwardly as desired so as to regulate the position of the duck-feet 126 which are suitably secured to the lower end of the duck-foot carrying members 124. The duck-feet 126 have horizontally disposed portions 127 which, as best seen in dotted lines in Figure 1, extend inwardly from the carrying members 124 and also incline rearwardly so as to present a horizontally rearwardly inclined forward edge to the ground.

The function of the duck-feet members 126 is to loosen the ground for preparing it for better operation of the disc 38.

It will be seen that the remainder of the construction can be used with or without the duck-feet members 126 in soil which is sufficiently loose without working or when the terracer is used in soil that has been previously plowed or loosened.

The disc is raised and lowered by means now to be described. Such means includes a system of arms, commonly referred to as a three-point hook-up. This arm system is hydraulically controlled through the provision of a hydraulically controllable rotatable shaft 136 on the tractor to which is attached a bar 137. The bar 137 extends upwardly and rearwardly from the rotatable shaft 136 and is pivotally attached by means of a bolt 140 to a downwardly and rearwardly extending arm 146. Each arm 146 is pivotally attached at its lower end by means of bolts 150 to the center portions of forwardly and rearwardly extending arms 160. The arms 160 are pivotally secured at their forward ends by means of bolts 161 to suitable ears 162 disposed beneath and suspended from the rear axle housing 163 of the tractor.

It will be seen in the side view, illustrated in Figure 2, that a center portion of the closer one of the arms 160 is broken away for clarity of illustration of important parts already described.

Each arm 160 has three portions, a first portion extending directly rearwardly from the bolt 161, a second portion extending rearwardly and outwardly to the side of the forward portion, and a rearward portion extending directly rearward from the center portion.

At their rearward ends the arms 160 are pivotally attached by means of suitable bolts 170 to the outside of the lower vertical portion 86 of the corresponding fish plate 84.

The arms 160 and the arm 96 represent the three arms of what is commonly called a three-point hook-up.

The effective length of the arms 96 and 160 are preferably exactly the same even though the lower arms 160 are not straight.

In other words, the distance from forward to rearward between each bolt 161 and its corresponding bolt 170 is the same as the distance between the bolt 97 and the bolt 98'.

Also it will be seen that a line drawn between the bolts 97 and 161, as seen in side view in Figure 2, will be in parallelism with a line drawn between the bolt 98' and the bolt 170.

Also, the arm 96 is spaced apart above the arms 160 and is disposed in parallelism with the arms 160, the arms 160 being in the same horizontal plane with each other.

In its upward and downward movement, the disc 38 describes an arcuate path. During its arcuate movement, however, it retains a constant relationship with the vertical. That is, the disc itself approaches the ground at a constant angle, its axis retaining a constant predetermined selected relationship to the horizontal, regardless of its vertical position.

This would not be true if the upper arm 96 was greatly shorter than the lower arms 160. Not only arcing of the disc would occur but its own axis would be tilted. This, in extreme dimensions, would cause it to be necessary to readjust the disc whenever it was raised or lowered to adjust its vertical position.

From the foregoing description, it is thought to be obvious that a disc terracer constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. A terracing machine comprising a rotatable upright disc having a concave forward side, means rotatably mounting said disc for rotation about an axis approximately horizontally disposed and inclinedly disposed with respect to a direction of drift whereby the lower end of said disc engages the ground, means comprising a motor for causing said disc to rotate in a direction downward at its forward edge at a speed sufficient for building terraces, means for deflecting dirt from the forward side of said disc to cause said dirt to be cast to a side of said disc, said deflecting means comprising a deflecting member disposed directly in front of said disc and having a portion closely spaced from the upwardly moving side of the front of said disc and having a rearward edge closely spaced from the upwardly moving side of the front of said disc and said rearward edge having a curvature generally complemental to adjacent parts of said disc for substantially preventing dirt thrown at terrace-building speed by said disc from flying up into the air from between said deflector portion and said disc, said deflecting member portion having an underside surface extending transversely of the axis of said disc and extending generally forwardly from said disc and of a substantial forward to rearward width for deflecting dirt and means for supporting said disc at a desired position with respect to the ground.

2. The combination described in claim 1 in which said dirt deflecting means extends from the outer edge of said disc inwardly to a point at least three-fourths of the distance from said outer edge inwardly to an imaginary vertical plane extending in parallelism with the axis of said disc, and in which the outer edge of said disc terminates along a substantially circular continuous line.

3. The combination described in claim 1 in which said dirt deflecting member is disposed above the axis of said disc, and more than half way from said axis to the outer upper edge of said disc.

4. The combination described in claim 1 in which said deflecting means extends on both the right and left hand sides of said disc for use both when said disc is throwing to the right and when said disc is throwing to the left.

5. The combination described in claim 1 in which said disc mounting means comprises two horizontal plates pivotally secured together for rotation with respect to each other and means attached to the under one of said two plates.

6. The combination described in claim 1 in which said disc supporting means comprises a tractor and means supporting said disc from said tractor and in which said motor means is the tractor motor.

7. The combination described in claim 1 including duckfoot means disposed in a position in front of said disc for loosening the ground disposed in front of said disc and with a minimum of resistance whereby said disc works in loosened soil, and means for supporting said duckfoot means in said position.

References Cited in the file of this patent

UNITED STATES PATENTS

| | | |
|---|---|---|
| 955,179 | Martin | Apr. 19, 1910 |
| 2,310,735 | Greer | Feb. 9, 1943 |
| 2,510,779 | Hancock | June 6, 1950 |
| 2,542,474 | Burchett | Feb. 20, 1951 |
| 2,561,032 | Onfrey | July 17, 1951 |
| 2,619,747 | Wiem | Dec. 2, 1952 |
| 2,659,447 | Witmore | Nov. 17, 1953 |